June 8, 1954 | L. KATZ | 2,680,578

GLIDE BOMB

Filed Feb. 17, 1945

INVENTOR.
LEONHARD KATZ

BY William D. Hall
ATTORNEY

Patented June 8, 1954 2,680,578

UNITED STATES PATENT OFFICE 2,680,578

GLIDE BOMB

Leonhard Katz, Dayton, Ohio

Application February 17, 1945, Serial No. 578,424

3 Claims. (Cl. 244—14)

(Granted under Title 35, U. S. Code (1952), sec. 266)

The invention described herein may be manufactured and used by or for the Government for governmental purposes, without the payment to me of any royalty thereon.

The invention to be hereinafter described relates to means for automatically correcting the line of sight to maintain it parallel to the line of flight of a moving object, such as a glide bomb, employing television for guidance.

Use of radio control and television for control of guided missiles is well known to the art and may be briefly explained as follows: A mother airplane or ground control station contains a radio transmitter and control box which permits the radio transmitter to be modulated with various control signals. The glide bomb or other moving object has or contains a radio receiver tuned to the same frequency and capable of translating or converting the received radio signals into actuation of servo-motors. These servo-motors control the rudder and elevators of the moving object. Thus, if the control operator on the mother airplane actuates the "down" control, the servo-motor in the glide bomb or other moving object will deflect the elevators downwards, causing the moving object to dive. In a similar manner, "left," "right" and "up" controls can be given. Throughout the description the term moving object is intended to include glide bombs, jet bombs, rocket bombs, airplanes and other aerial devices to which the invention may be applied.

A television transmitter and camera is located on the moving object and transmits a signal to a television receiver in the mother airplane in such a manner that the picture displayed on the receiver in the mother airplane corresponds in all details as closely as possible to the scene viewed by the television camera. The transformation of the optical image into electrical impulses, its transmission by radio, and its detection and reproduction on a cathode ray screen are all well known to the art to which this invention relates and need not, therefore, be further amplified or detailed here.

The control operator in the mother airplane looks at the television screen and observes the objects which are located within the angle of view of the television camera of the moving object. With the aid of his radio control box, he will actuate the control devices of the moving object, as previously described, until the object which he has chosen as his target is brought to the center of the screen, defined by means of cross-hairs. By maintaining the target on the cross hairs of the screen, the axis of the moving object is directed toward the target and compelled to fly a collision course with the target, eventually destroying it.

Heretofore, it has been the practice to first observe the target in the television screen and then make corrections by means of radio control to see that the target remains centered, as hereinabove set forth.

The above method was found to be rather unsatisfactory because of the great skill required by the operator. It will be seen that if there is an angular difference between the line of sight through the cross hairs of the television camera and the line of flight of the moving object, continuous corrections will have to be made to keep the target centered. However, when the moving object approaches the target closely the movement of the target image on the screen will be so rapid that no effective control can keep it centered. In other words, the moving object will travel a course toward the target approximating a "master and dog curve" or "follower curve."

When the moving object is a glide bomb or other missile having no propelling power, the line of flight will generally lie below the axis of the missile and therefore below the line of sight if made parallel to said axis. The location of the line of flight below the line of sight is due to the downward force of gravity which adds a vertically downward velocity component to the axial velocity of the missile. The line of flight will therefore intersect the ground at a point short of a target on the ground and seen on the cross hairs of the screen when the optical axis is aligned parallel to the axis of the missile. The line of flight of a missile under the control of the operator who endeavors to keep the target on the cross hairs so aligned, will generally lie below the line of sight through the target and will therefore strike the ground prematurely.

In order to fly a straight-line course toward the target, the operator has to find a spot on the screen in which the target will no longer move, if no controls are given. This spot will then indicate the line of flight of the bomb, etc. and is not necessarily located in the center of the television screen. This point of zero movement will vary, among other things, with air-speed and attitude of the glide bomb.

When a glide bomb has been launched with a given setting of the elevators, it finally attains a stabilized attitude relative to a horizontal plane, and the line of flight, as pointed out above, will generally be inclined below the axis of the bomb.

If the axis of the television camera is aligned parallel to the axis of the bomb it will not fly a straight course toward a target seen on the cross hairs of the television screen. In order to make the bomb fly the desired course, it is necessary to deflect the axis of the camera downward into parallelism with the line of flight. The line of flight relative to the axis of the bomb is dependent on the setting of the elevators and so also is the required angular position of the camera axis. The initial settings of the elevators before launching and the corresponding setting of the camera axis for any desired line of flight, may be predetermined by tests on the glide bomb in a wind tunnel. From data so determined the bombardier on the mother plane may set the elevators and the camera axis before launching, in positions which will cause the bomb to fly approximately a course toward a selected target, and the progress of the flight may be observed on the television screen of the control plane.

The purpose of radio control of the glide bomb is to enable the control operator viewing the progress of flight on the television screen to make corrections in the initial settings as may appear necessary. It will be apparent from the above that, if the control operator changes the initial setting of the elevators to raise the axis of the bomb, he must also make a corresponding change, in the opposite sense, in the setting of the camera axis in order to maintain the line of sight parallel to the new line of flight.

The object or purpose of the present invention is to provide means to automatically maintain the line of sight of the television camera and the line of flight of the moving object carrying the camera, parallel during manual adjustment of the elevators by remote control. This means permits the operator to concentrate on keeping the target centered on the cross hairs of the screen without necessitating his finding a point of zero movement. As long as the line of flight of the glide bomb or other moving object and the line of sight of the television camera remain parallel, an object located on the line of flight will appear on the cross hairs of the television screen.

According to the present invention, the means provided for automatically maintaining the line of sight parallel to the line of flight each time the control operator makes a change in the setting of the elevators of the glide bomb includes a servo-motor mechanically connected to the television camera and adapted to shift the optical axis thereof, and an electrical connection from the camera motor to the servo-motor provided to change the setting of the elevators.

In order to keep the line of sight of the television camera parallel to the line of flight of the glide bomb or other moving object, under conditions of altitude, air-speed and other factors, it is possible to rotate the television camera around an axis perpendicular to the line of flight of the glide bomb or other moving object and in the horizontal plane.

It will readily be seen that if the lens alone is moved in a plane perpendicular to the line of sight while the television pick-up tube remains stationary, the effect on the observer viewing the receiving screen will be the same as if the camera had been rotated around the axis perpendicular to the line of sight and in the horizontal plane.

In the preferred embodiment of the invention the lens alone is moved and the structure is so designed as to obtain results fully equivalent to those obtainable by tilting the entire camera. This lens movement is actuated by a small electro-motor which is wired in parallel with the well known servo-motors of the elevators of the glide bomb or other moving object, but in such manner that when the glide bomb or other moving object elevators are moved downwards the camera lens will be moved upwards and vice versa. The ratio of gear reductions for effecting the lens movement by the servo-motors is predetermined, of course, so that the proper corrections will result. The amount, extent or degree of correction, as affected by altitude, etc., is known and has been determined by wind-tunnel and other recognized tests, all as will be well understood by those skilled in the art. It is not believed necessary to go into further detail either as to description or illustration, as these tests and facts are all well known to those skilled in the art.

The initial zero alignment of the camera lens at the beginning of the flight of the glide bomb carrying the television camera after the flight has become stabilized immediately after launching, is parallel to the line of sight of the television camera.

In order to more clearly disclose the construction and operation of the mechanism for moving the lens, reference should be had to the accompanying drawings forming part of the present application. Throughout the several figures of the drawings like reference characters designate the same parts in the different views.

Figures 1, 2, 3, 5:
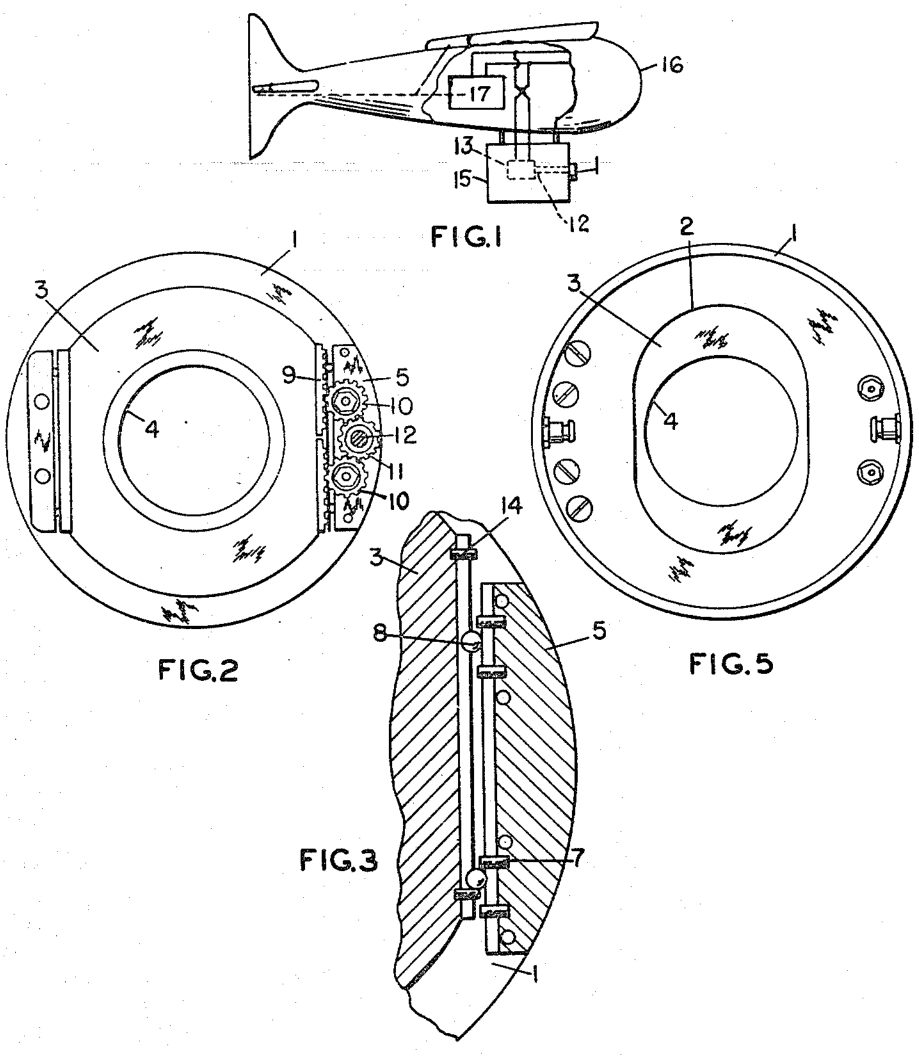
Fig. 1 is a diagrammatic side elevation showing location of the invention on a glide bomb.
Fig. 2 is a rear elevation of a lens mount actuated by the invention, and related driving connections.
Fig. 3 is a fragmentary cross-section through one stationary ball race and adjacent portion of the lens mount block showing the ball retaining pins.
Fig. 5 is a front elevation of the lens mount of Fig. 2.
Figure 4:
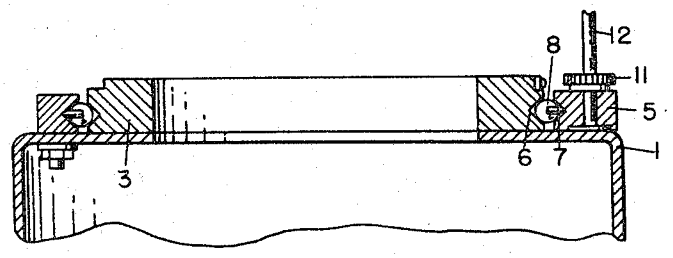
Fig. 4 is a horizontal cross-section through Fig. 2.

Referring to the drawings in detail, 1 indicates the lens barrel of the usual television camera 15 carried by the glide bomb or other moving object 16. The rear wall of lens barrel 1 is provided with an opening 2, preferably, elliptical in outline having a short diameter slightly greater than the lens diameter and a long diameter approximately equal to its short diameter plus the maximum distance which the lens is to be travelled. Slidably mounted on the lens barrel is a lens mount block 3, so positioned that the lens opening 4 therein will, at all times and positions of the block, register with some portion of the opening 2. The block is so disposed and moved that the full diameter and area of the opening 4 will, at all times fall within the bounds of opening 2, so that, at no time, will an edge of 2 overlap any part of opening 4 or intercept the line of sight of the lens. The barrel 1, being part of the camera 15 is, of course, stationary. Lens mount 3 is positively guided in its movements between ways 5 fixed to barrel 1. To reduce friction and facilitate movement of mount 3 through the ways, V-shaped or other suitable ball races 6 are provided, with cooperating races in the adjacent edges or walls of block 3. Preferably, suitable small pins or stops 7 may be provided to retain ball bearings 8 against possible accidental loss. Pins 14 carried by block 3 may be provided to engage pins 7 to limit travel of block 3 in opposite directions.

To effect the desired travel of the lens a rack-and-pinion drive is provided, comprising a rack 9 carried by one edge of the lens block 3 and a pair of engaging pinions 10 mounted on the adjacent way 5, the pinions being driven by a small cooperating gear 11 also mounted on way 5 between pinions 10.

If desired the pins 7 may be of such length and so disposed that one or another on the stationary ways will engage one or another on the lens block 3 to limit or define extreme travel of the block in one or the other of its directions.

The drive gear 11 is made fast to and actuated by the counter or drive shaft 12 which is automatically operated from a small electromotor 13 indicated in outline in Fig. 1. This motor, as hereinbefore stated, is wired in parallel with the well known servo-motors 17 of the elevators of the glide bomb or other moving object, the wiring, however, being so arranged that when the glide bomb or other moving object elevators are moved downward the camera lens will be moved upward and vice versa.

It is thought that the construction, operation and use of the invention will be clear from the preceding description.

Changes may be made in the construction, arrangement and disposition of various parts of the invention within the scope of the appended claims without departing from the field of the invention and it is meant to include all such within this application wherein only one preferred arrangement has been illustrated purely by way of example and with no thought or intent to, in any degree, limit the invention thereby.

Having thus described my invention, what I claim and desire to protect by Letters Patent is:

1. A radio controlled glide bomb including a radio receiver responsive to remote control signals, a television camera having cross-hairs defining the optical axis thereof, said optical axis being initially fixed relative to the axis of the bomb so as to bring a pre-selected target into the field of view, a radio transmitter responsive to image scanning signals from said camera and adapted to form a picture on a television screen at a point of remote control, servo-motor means responsive to said control signals connected to the elevators of the glide bomb to vary the position thereof, thereby modifying the attitude of the bomb, and means for correcting the vertical inclination of said optical axis relative to the line of flight when said elevators are altered during flight to bring the image of said target on said cross-hairs, said correcting means including a servo-motor electrically connected in parallel with said elevator servo-motor and mechanically geared to the lens of said camera to alter the position thereof transversely.

2. A television-guided missile including a television camera having cross-hairs defining the optical axis thereof, said optical axis being initially fixed relative to the axis of the bomb so as to bring a pre-selected target into the field of view, a radio transmitter responsive to image scanning signals from said camera and adapted to form a picture on a remote television screen, a radio receiver responsive to remote control signals, servo-motor means responsive to said control signals adapted to alter the vertical attitude of the bomb and thereby modify the vertical inclination of the line of flight, and means for correcting the deviation of the line of sight along said optical axis from said line of flight following a change in the attitude of the bomb caused by the operation of said servo-motor, said deviation correcting means including a second servo-motor connected electrically in parallel with said first mentioned servo-motor and mechanically geared to said television camera to vary the optical axis thereof vertically.

3. A television-guided missile including a television camera having its optical axis initially set relative to the axis of the bomb so as to bring a pre-selected target into the field of view, a radio transmitter responsive to image scanning signals from said camera, a television receiver at a remote control point responsive to signals from said transmitter, a radio receiver on the missile responsive to remote control signals, servo-motor means responsive to said receiver control signals connected mechanically to the elevators of the missile to alter the attitude thereof and thereby vary the line of flight, and means for correcting the deviation of said optical axis from the line of flight caused by the operation of said elevator servo-motor, said deviation correcting means including a servo-motor connected electrically in parallel with said elevator servo-motor and mechanically geared to the camera to tilt the optical axis thereof vertically.

References Cited in the file of this patent

UNITED STATES PATENTS

| Number | Name | Date |
|---|---|---|
| 1,110,333 | Moine | Sept. 15, 1914 |
| 1,388,932 | Centervall | Aug. 30, 1921 |
| 1,747,664 | Droitcour | Feb. 18, 1930 |
| 2,064,964 | Wickes | Dec. 22, 1936 |
| 2,134,757 | Goldsmith | Nov. 1, 1938 |
| 2,237,440 | Jones | Apr. 8, 1941 |
| 2,262,942 | Jones | Nov. 18, 1941 |
| 2,307,479 | Annick | Jan. 5, 1943 |
| 2,359,032 | Gott | Sept. 26, 1944 |
| 2,380,829 | Eddy | July 31, 1945 |
| 2,403,023 | Reynolds | July 2, 1946 |

FOREIGN PATENTS

| Number | Country | Date |
|---|---|---|
| 352,035 | Great Britain | June 22, 1931 |

OTHER REFERENCES

Proc. IRE, June 1946, pages 375 to 401. (Copy in Patent Office Lib.).

Television, vol. IV, pages 359 to 368, 1946. (Copy in Div. 16).